Figure 1:
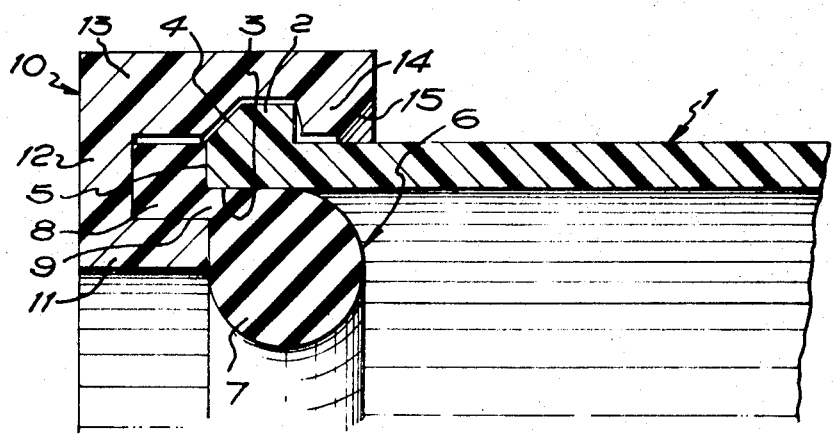

United States Patent

Glover

[15] 3,645,547
[45] Feb. 29, 1972

[54] PIPE COUPLINGS

[72] Inventor: John B. Glover, Stocksbridge, England

[73] Assignee: The Hepworth Iron Company Limited

[22] Filed: Oct. 17, 1969

[21] Appl. No.: 867,313

[30] Foreign Application Priority Data

Feb. 7, 1969 Great Britain..........................6,837/69

[52] U.S. Cl..............................277/207, 285/110, 285/345, 285/DIG. 22

[51] Int. Cl...................................F16j 15/10, F16l 21/02

[58] Field of Search.................285/230, 231, 110, 345, 379, 285/DIG. 22; 277/207, 207 A

[56] References Cited

UNITED STATES PATENTS

| | | | |
|---|---|---|---|
| 2,116,705 | 5/1938 | Marx et al. | 285/231 |
| 3,047,025 | 7/1962 | Davis | 285/DIG. 22 |
| 3,400,954 | 9/1968 | Brown | 285/110 |
| 3,516,693 | 6/1970 | Glover | 285/345 |

FOREIGN PATENTS OR APPLICATIONS

| | | | |
|---|---|---|---|
| 642,987 | 5/1928 | France | 285/231 |
| 1,362,532 | 4/1964 | France | 285/110 |
| 1,472,035 | 1/1967 | France | 285/110 |
| 6,805,101 | 10/1969 | Netherlands | 285/231 |
| 432,953 | 9/1967 | Switzerland | 285/110 |

Primary Examiner—Thomas F. Callaghan
Attorney—Watson, Cole, Grindle & Watson

[57] ABSTRACT

A pipe coupling comprises a slightly resilient plastics socket with an integral external peripheral projection adjacent its mouth, a resilient sealing ring having an annular sealing head inside the socket and an annular flange abutting the rim of the mouth of the socket, the sealing head being connected to the flange by an annular neck having a radial thickness less than the axial and radial thicknesses of the flange, and a locking ring of slightly resilient channel section plastics material, with the annular base of the channel section lying against the face of the flange of the sealing ring, remote from the mouth of the socket, with the annular inner side of the channel section locking ring lying against the inside face of the flange of the sealing ring and having an axial depth not greater than the axial thickness of the flange, and with the annular outer side of the channel section locking ring overlapping the outside of the mouth of the socket and having on its inner face an integral peripheral projection engaging behind the projection round the outside of the socket.

6 Claims, 5 Drawing Figures

Patented Feb. 29, 1972

3,645,547

2 Sheets-Sheet 1

INVENTOR,
John Benjamin Glover
BY
Watson, Cole, Grindle & Watson

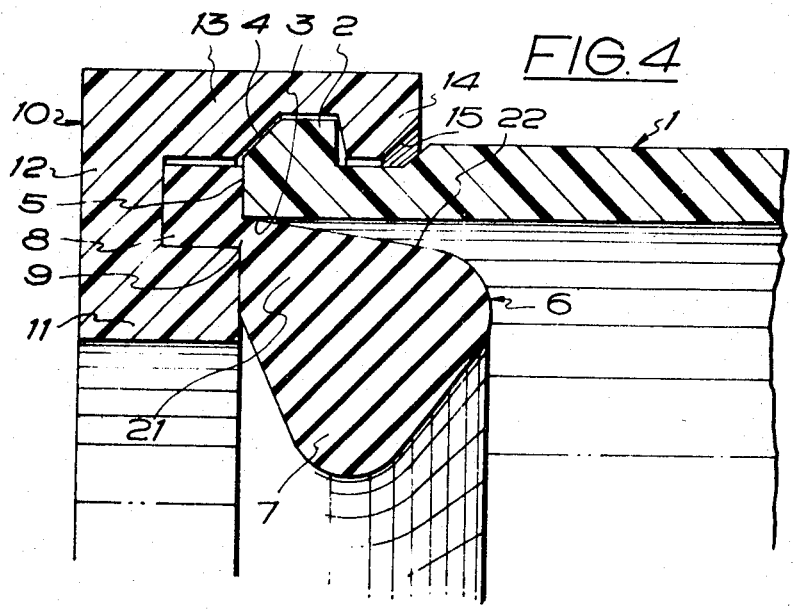
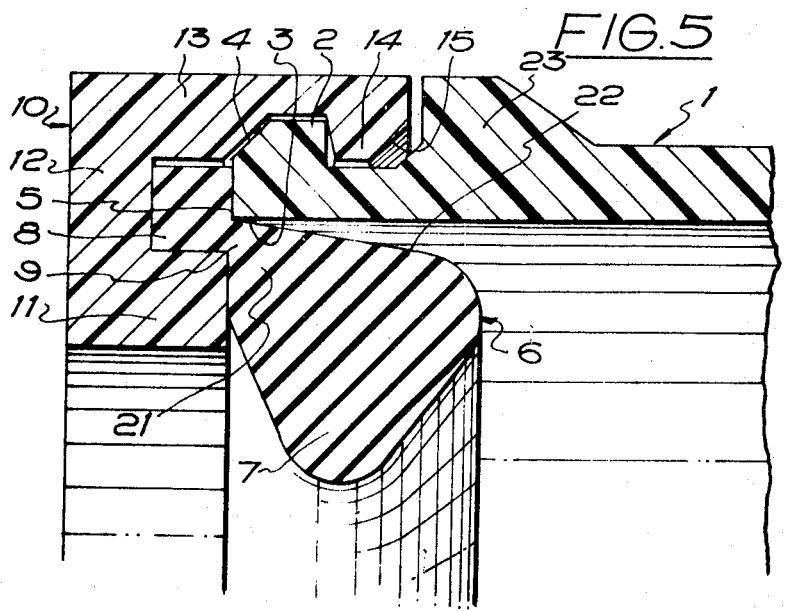

PIPE COUPLINGS

This invention relates to pipe couplings for plastics piping or piping of clayware, pitch-fiber, asbestos-cement or concrete, such as is used in sewers, drains and cable conduit, the couplings being of the type in which a resilient sealing ring is located in a socket at one or both ends of a slightly resilient plastics pipe length or at one end of a slightly resilient plastics sleeve, for the sealing ring to be compressed or distorted upon insertion of the spigoted end of a pipe length into the socket.

It is known to house the sealing ring in an inwardly facing annular recess in the socket, but the injection moulding of a socket with such a recess involves the use of a collapsible core, which is complicated and costly, quite apart from the problem of ensuring that the sealing ring will not be dislodged from the recess upon insertion of a spigoted pipe end into the socket.

The main object of the invention is to provide such a pipe coupling with a sealing ring positively held against dislodgement by an inserted pipe end, without creating complicated moulds or cores, and with economy of plastics material.

Another object of the invention is to provide a pipe coupling able to accommodate itself to the peripheral profile of a pipe end, more particularly of a fired clayware pipe length that may have appreciable ovality.

Yet another object is to provide a pipe coupling capable of accepting an appreciable tolerance on the nominal diameter of the pipe lengths without risk of loss of sealing efficiency.

According to the present invention, a pipe coupling comprises a slightly resilient plastics socket with an integral external peripheral projection adjacent its mouth, a resilient sealing ring having an annular sealing head inside the socket and an annular flange abutting the rim of the mouth of the socket, the sealing head being connected to the flange by an annular neck having a radial thickness less than the axial and radial thicknesses of the flange, and a locking ring of slightly resilient channel section plastics material, with the annular base of the channel section lying against the face of the flange of the sealing ring, remote from the mouth of the socket, with the annular inner side of the channel section locking ring lying against the inside face of the flange of the sealing ring and having an axial depth not greater than the axial thickness of the flange, and with the annular outer side of the channel section locking ring overlapping the outside of the mouth of the socket and having on its inner face an integral peripheral projection engaging behind the projection round the outside of the socket. Thus both the socket and the locking ring are simple injection mouldings and the sealing ring is a simple moulding located in the socket by the flange abutting the rim of the socket mouth, and the sealing ring is locked in place by its flange being substantially enclosed between the locking ring and the rim of the socket mouth, and being unable to be drawn out through the annular gap between the inner edge of the rim of the socket mouth and the adjacent edge of the inner side of the channel section locking member.

The projection round the outside of the socket and the projection on the inner face of the outer side of the channel section locking ring may comprise complementary screw threads, to enable the locking ring to be screwed on to the socket after the sealing ring has been fitted with its flange abutting the rim of the socket mouth. Alternatively, the peripheral projection on the inner face of the outer side of the channel section locking ring may be bevelled or rounded, to enable it to snap over the projection round the outside of the socket, and the latter projection may be bevelled or rounded alternatively, but preferably also, to assist the snapping-over of the locking ring. In this case, the radial thickness of the flange is preferably less than the radial distance between the sides of the channel section locking ring, to ensure sufficient space to accommodate the material of the flange even if the latter is compressed between the rim of the socket mouth and the base of the channel section locking ring as that member snaps into place. The wall of the socket may be provided with a thickening spaced from the projection round the outside of the socket by at least the axial thickness of the projection on the inner face of the outer side of the channel section locking ring, with the outside diameter of the thickened wall at least equal to the outside diameter of the outer side of the channel section locking ring, so that the thickening affords protection against snagging of the outer side of the channel section locking ring, such as could pull the latter off the socket.

The sealing head may have a substantially circular cross section, flared or blended from the neck through which it is connected to the flange, so that it resembles—as closely as possible—an O-ring sealing ring of conventional type. For use with plastics piping, with which close tolerances can be assured, the sealing head may immediately adjoin the neck, but for use with clayware piping or other piping with which close tolerances cannot be assured, the sealing head is preferably spaced from the neck farther into the socket and connected thereto by an intermediate portion affording a lead-in to the sealing head from the outside surface of the inner side of the locking ring i.e., the innermost surface of the locking ring). The side of the intermediate portion nearest the wall of the socket preferably arches away from that wall, so as to leave space between the neck and the sealing head available for accommodating some of the material of the consequentially larger sealing head when the latter is compressed or distorted upon insertion of a spigoted pipe end into the socket.

Alternatively, the sealing head may take the form of a nozzlelike lip—with or without peripheral ribs on the inside and/or outside—extending both axially and radially into the socket from the neck, but in either case the primary purpose of the resilient sealing ring is to accommodate tolerances on nominal diameter; ovality or other variations in the peripheral profile of pipe ends are primarily accommodated by the socket conforming to the profile, and the locking member does not add any appreciable resistance to such changes in the profile of the socket from the substantially truly circular as initially moulded, but does afford sufficient hoop stiffness to ensure good sealing efficiency.

Again, the sealing head may have a generally triangular cross section with one corner blended into the neck, and the side of the section adjacent the wall of the socket preferably diverges from the wall of the socket, so that upon insertion of a spigoted pipe end into the socket the sealing head is first deflected or distended—until the aforesaid side of the section meets the wall of the socket—and then is distorted or compressed as the pipe end is forced through the sealing ring.

The socket may itself be a short length of enlarged diameter on the end of a plastics pipe, the shoulder between the socket and the main length of pipe serving for abutment by a spigoted pipe end of a similar plastics pipe. Alternatively, the socket may be one end of a sleeve the other end of which is adapted to be a force-fit or to be secured by adhesive on one end of a plastics pipe or a clayware pipe, for the socket to serve to receive the nonsleeved end of a similar pipe-length. Again, the socket may be one end of a sleeve the other end of which is formed with a similar socket with sealing ring and locking ring, to receive adjacent ends of plain-ended plastics or clayware pipe lengths; the sleeve may be provided at its midlength with one or more small integral internal projections or a flange or may be otherwise constricted internally to less than the outside diameter of pipe lengths to which it is intended to be fitted, for facilitating location of the sleeve on a pipe end to which it is first applied.

The socket and the locking ring are preferably formed of the same material. Suitable materials for the socket and locking ring are modified or unmodified "rigid" polyvinyl chloride, polycarbonate, polyacetal, acrylonitrile butadiene styrene, and polypropylene, and a suitable material for the sealing ring is natural or synthetic rubber, e.g., butyl rubber, or a like elastomeric material.

Four embodiments of the invention and a modification will now be described, by way of example only, with reference to the accompanying drawings, in which all five FIGS. are enlarged fragmentary axial sections showing the mouths of pipe coupling sockets provided with sealing rings and locking rings in accordance with the invention.

In FIG. 1, a pipe coupling socket 1 is injection-moulded in slightly resilient plastics material with an integral external peripheral projection 2 adjacent its mouth 3, and the side 4 of the projection adjacent the rim 5 of the socket mouth is bevelled. A resilient sealing ring 6 has an annular sealing head 7 of substantially circular section inside the socket and an annular flange 8 abutting the rim 5 of the socket mouth, the sealing head being connected to the flange by an annular neck 9 having a radial thickness less than the axial and radial thicknesses of the flange. A locking ring 10 is injection-moulded in slightly resilient plastics material with a channel section having a short inner side 11 connected by a base 12 to a long outer side 13, which has an integral internal peripheral projection 14 with a bevelled side 15 for cooperating with the bevelled side 4 of the projection 2 round the socket mouth 3 to enable the locking ring to snap on to the socket and lock the sealing ring in place. The axial depth of the inner side 11 of the locking ring 10 is equal to the axial thickness of the flange 8 of the sealing ring 6, so that the flange is substantially enclosed between the locking ring and the rim 5 of the socket mouth, but the flange is unable to be drawn out through the annular gap between the inner edge of the rim and the adjacent edge of the inner side of the locking member because the neck 9 is narrower than the axial and radial thicknesses of the flanges.

The embodiment of FIG. 1 is intended primarily for use with plastics pipe lengths, with which close tolerances can be assured. For use with clayware or other piping with which close tolerances cannot be assured, the embodiment of FIG. 2 is preferred.

Figure 2:
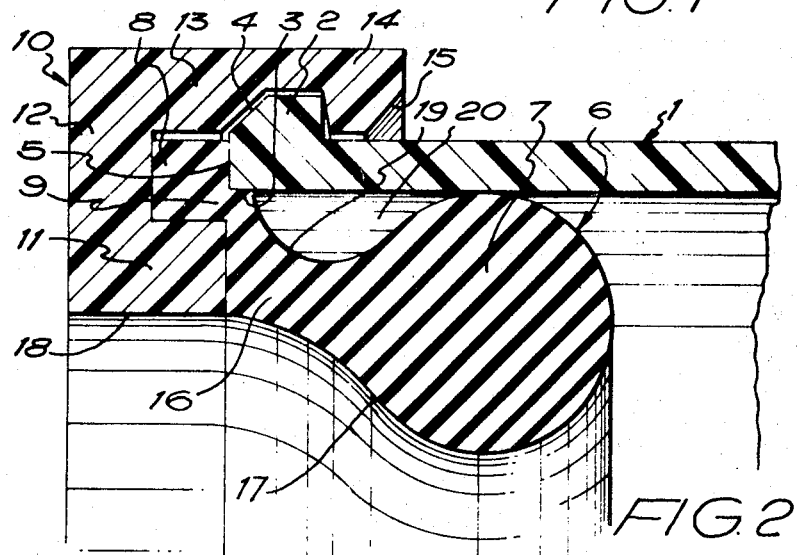

In FIG. 2 the socket 1 and the locking ring 10 are substantially identical with those in FIG. 1, and the flange 8 of the sealing ring is also substantially identical too, but the sealing head 7—which is of larger sectional diameter to accommodate a greater tolerance range on nominal pipe diameter—is apaced from the neck 9 and connected thereto by an intermediate portion 16 affording a lead-in 17 to the sealing head from the outside surface 18 of the inner side 11 of the locking ring 10. The side 19 of the intermediate portion 16 nearest the wall of the socket 1 arches away from that wall, so as to leave space 20 between the neck 9 and the sealing head 7 available for accommodating some of the material of the sealing head when the latter is compressed or distorted upon insertion of a spigoted pipe end (not shown) into the socket.

Figure 3:
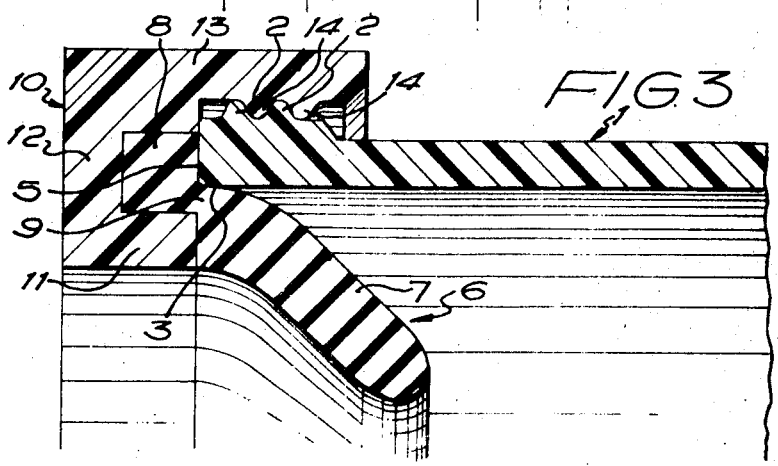

In FIG. 3, the projections 2 and 14 on the socket 1 and the locking ring 10 respectively take the form of complementary screw threads, and the sealing head 7 takes the form of a nozzlelike lip extending both axially and radially into the socket 1 from the neck 9, the sealing head being distended or deflected by a spigoted pipe end (not shown) inserted into the socket.

In FIGS. 4 and 5, the projections 2 and 14 on the socket 1 and the locking ring 10 respectively are the same as in FIGS. 1 and 2, and the sealing head 7 has a generally triangular cross section with one corner 21 blended into the neck 9 and the side 22 of the section adjacent the wall of the socket diverges from that wall, so that upon insertion of a spigoted pipe end (not shown) the sealing head is first deflected or distended—until the side 22 of the section meets the wall of the socket—and then is distorted or compressed as the pipe end is forced through the sealing ring. In FIG. 4 the wall of the socket 1 is shown thickened up to just short of the projection 2, to stiffen the socket—as may be desirable in couplings for larger diameter of pipe—while in FIG. 5 a more appreciable thickening 23 is provided spaced from the projection 2 by slightly more than the axial thickness of the projection 14 on the channel section locking ring 10, with the outside diameter of the thickening 23 equal to the outside diameter of the outer side 13 of the locking ring, so that the thickening 23 affords protection against snagging of the outer side of the locking ring, such as could pull the latter off the socket 1.

What I claim is:

1. A pipe coupling of the type comprising a slightly resilient plastic socket having an integral, external, peripheral projection adjacent its mouth, a resilient sealing ring having an annular sealing head disposed inside said socket and an annular flange abutting the rim of said socket mouth, said sealing head being connected to said flange by an annular neck having a radial thickness no greater than half the axial or radial thickness of said flange, and a locking ring of slightly resilient channel section plastic material, the annular base of the channel section lying against the face of said sealing ring flange remote from said socket mouth, the annular inner side of the channel section lying against the inside face of said sealing ring flange, and the annular outer side of the channel section overlapping the outside of said socket mouth and having on its inner face an integral peripheral projection engaging behind said socket projection; characterized in that the axial depth of said annular inner side of said channel section locking ring is substantially equal to the axial thickness of said sealing ring flange, and in that said annular sealing head is flared or blended from said annular neck connecting it to said flange, whereby said neck lies substantially in the plane of said rim of said socket mouth.

2. A pipe coupling as in claim 1, wherein the radial thickness of the flange is less than the radial distance between sides of the channel section locking ring.

3. A pipe coupling as in claim 1, wherein the sealing head is spaced from the neck farther into the socket and connected to the neck by an intermediate portion affording a lead-in to the sealing head from the outside surface of the inner side of the locking ring.

4. A pipe coupling as in claim 3, wherein the side of the intermediate portion nearest the wall of the socket arches away from that wall.

5. A pipe coupling as in claim 1, wherein the sealing head has a generally triangular cross section with one corner blended into the neck.

6. A pipe coupling as in claim 5, wherein the side of the section adjacent the wall of the socket diverges away from the wall of the socket.

* * * * *